United States Patent [19]

Feltz et al.

[11] 4,113,368
[45] Sep. 12, 1978

[54] AUTOMATIC LOWER LOOP RESTORER MECHANISM

[75] Inventors: Albert J. Feltz, Rochester; Howard C. Deck, Henrietta, both of N.Y.

[73] Assignee: The Singer Company, New York, N.Y.

[21] Appl. No.: 811,913

[22] Filed: Jun. 30, 1977

[51] Int. Cl.$^2$ .............................................. G03B 1/56
[52] U.S. Cl. ....................................... 352/159; 226/36
[58] Field of Search ................... 352/159; 226/36, 113

[56] References Cited

U.S. PATENT DOCUMENTS

| | | | |
|---|---|---|---|
| 2,434,355 | 1/1948 | Fairbanks | 352/159 |
| 2,494,842 | 1/1950 | Thevenaz | 352/159 |
| 2,673,486 | 3/1954 | Cunningham | 226/36 |
| 2,699,702 | 1/1955 | Cuber | 352/159 |
| 3,021,039 | 2/1962 | Michaels | 226/36 |
| 3,746,227 | 7/1973 | Krob et al. | 352/159 |

Primary Examiner—Monroe H. Hayes
Attorney, Agent, or Firm—Charles R. Lewis

[57] ABSTRACT

A lower loop restorer for automatically resetting the lower loop of a motion picture projector when the loop is lost. A loop restoring roller, located in the film path, is provided at one end of a pivotable control arm assembly. When the lower loop is lost, the control arm is triggered to cause drive means to pivot the control arm assembly downward and then upward to pull film from the film gate and reset the lower loop. Means are provided to disable or inhibit the operation of the lower loop restoring mechanism when the projector is operated in the reverse projection mode, the in path fast forward mode, or the inpath rewind mode. Means are also provided to protect the film from damage if the lower loop restorer is triggered and film is jammed in the film gate.

6 Claims, 9 Drawing Figures

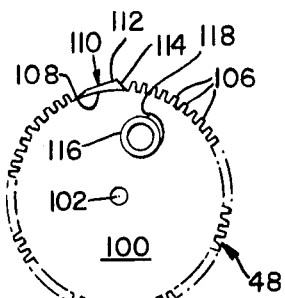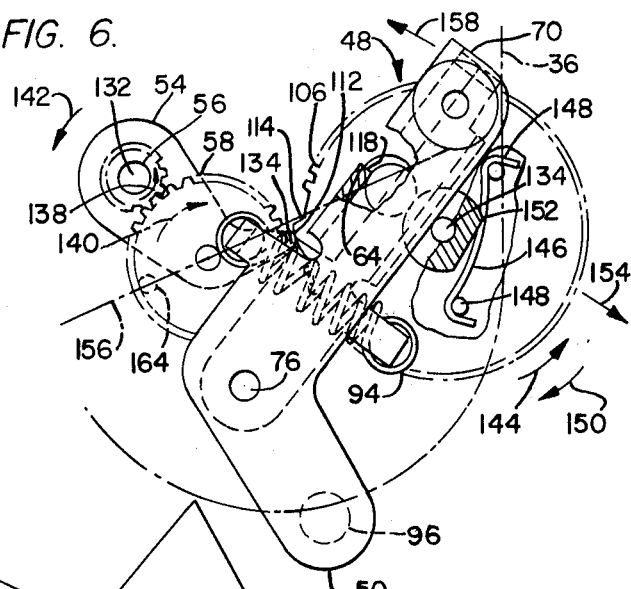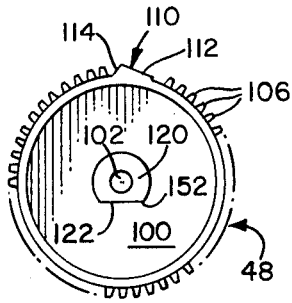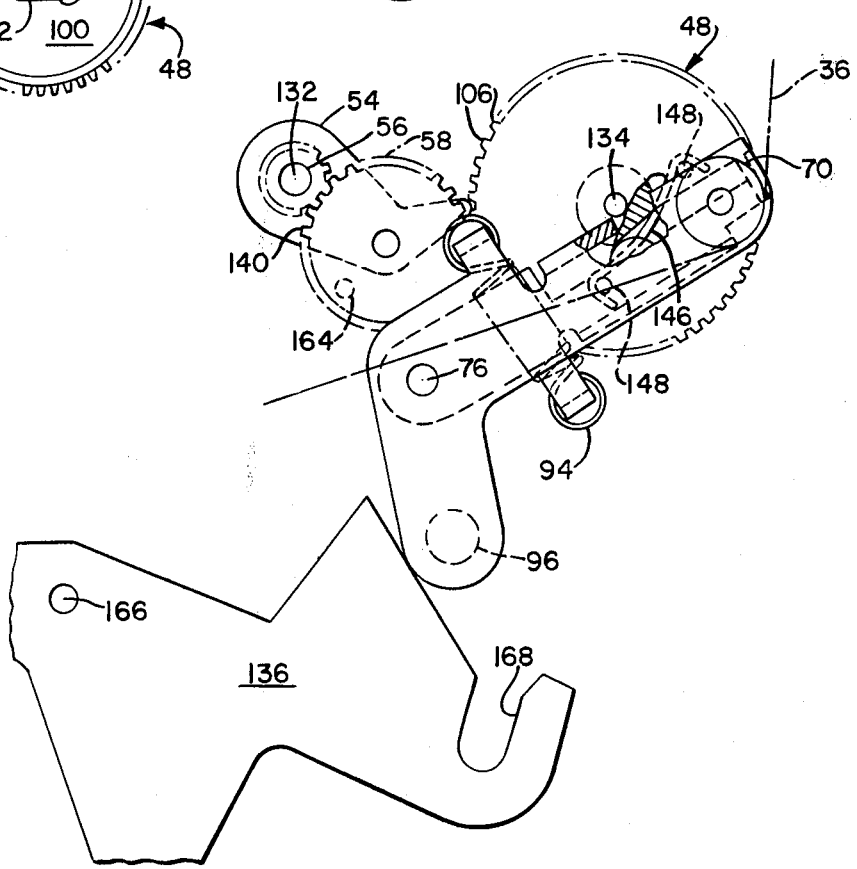

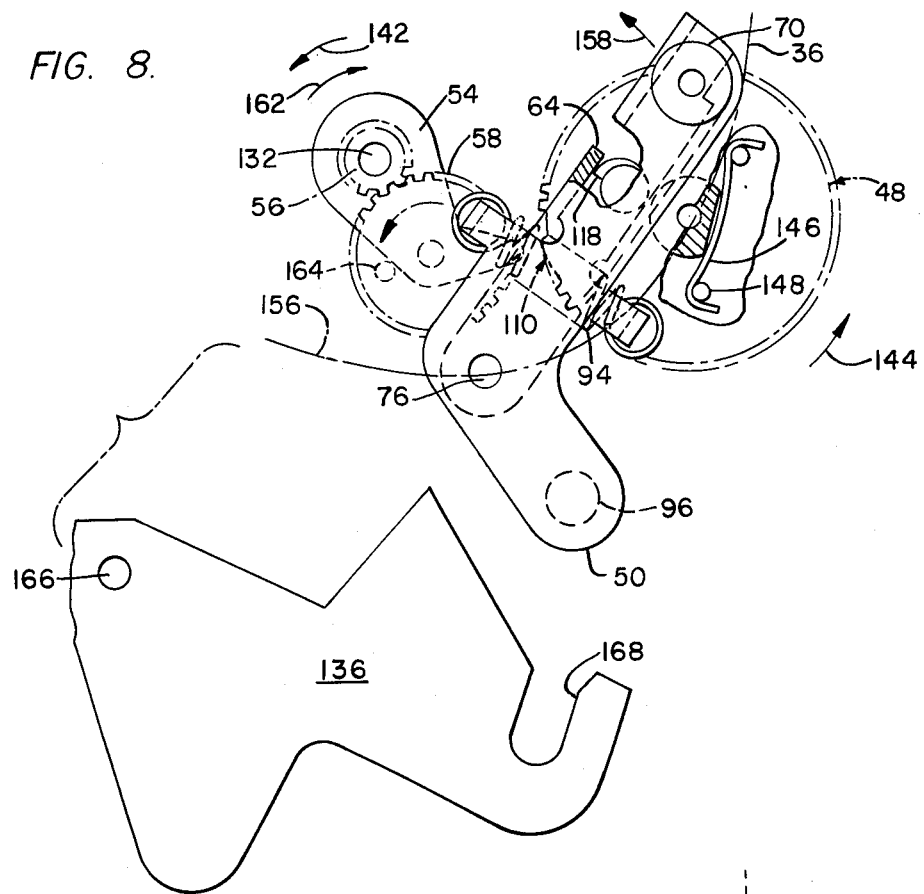
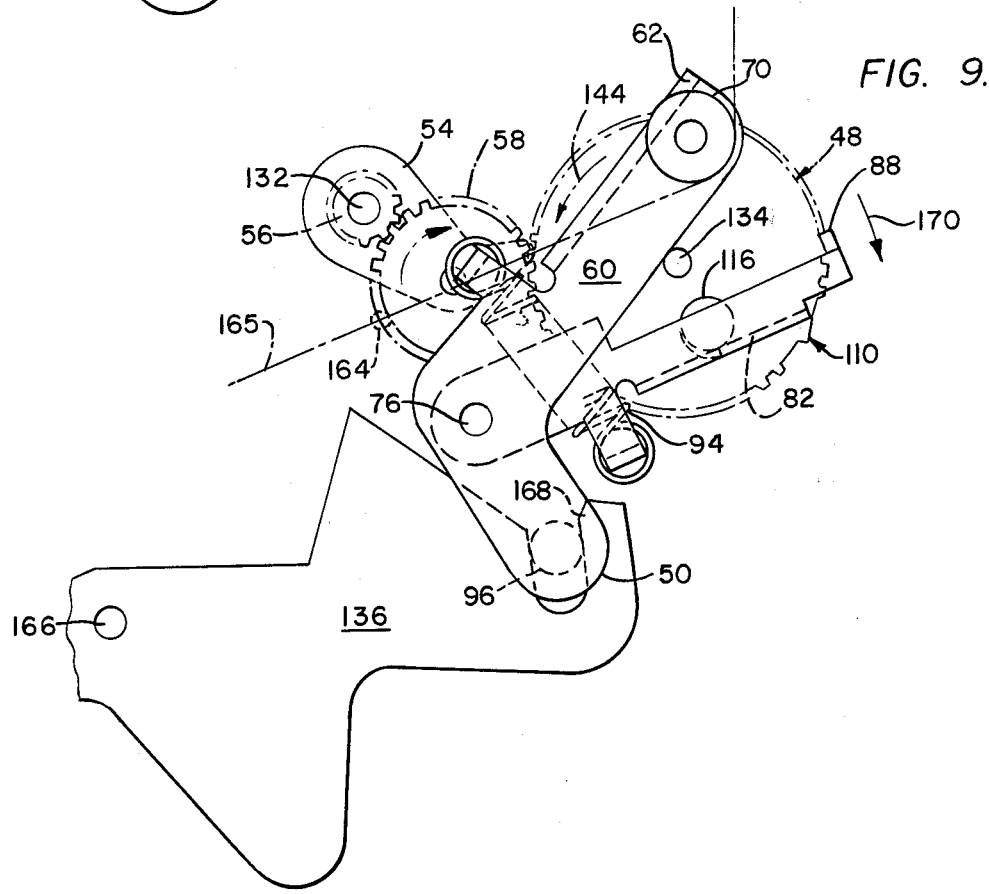

AUTOMATIC LOWER LOOP RESTORER MECHANISM

FIELD OF THE INVENTION

The present invention relates to mechanisms for use with motion picture projectors. More specifically, the present invention relates to mechanisms for automatically resetting or restoring a lost film loop.

PRIOR ART

Conventional sound motion picture projectors provide a film gate thru which the film is incremented by film driving means on a frame by frame basis for projection, and a sound drum around which the film is continuously transported for sound signal reproduction. In order to isolate the intermittent motion of the film thru the film gate from the sound drum, and the continuous motion of the film around the sound drum from the film gate, it is customary to provide a slack loop in the film between the film gate and the sound drum. This slack loop is known as a lower loop. For 16 MM film projection, the length of the lower loop is established by an industry wide standard as 26 frames. With this loop length, synchronization is achieved between the visual presentation and the sound presentation.

Occasionally, the film drive means may not be able to increment the film thru the film gate because of damage to or irregularities in the film. Such damage or irregularities may include splice repairs, torn, worn, or missing sprocket holes, heat damage, and the like. When the film is not incremented thru the film gate, the sound drum will continue to transport the film and thereby takeup or shorten the slack lower loop. In time the film between the sound drum and the film gate becomes taut and the lower loop is lost causing the loss of the visual sound synchronization.

The present invention provides a lower loop restorer mechanism to automatically restore the lower loop when it is lost. The mechanism is inexpensive to manufacture, and operates reliably without the need for critical adjustment. A loop setting roller is provided at a location in the film path and means are provided to cause the loop setting roller to move downward and then upward to reset the loop. Means are provided to protect the film from damage when the loop is jammed in the film gate and the lower loop restorer triggered. Means are also provided to disable or inhibit the lower loop restorer mechanism during the reverse projection mode, the in path fast forward mode, or the in path rewind mode.

BRIEF DESCRIPTION OF THE DRAWINGS

The present invention will be fully understood from consideration of the following detailed description of the preferred embodiment taken in conjunction with the accompanying drawings, in which like reference characters refer to like structure in the several views, and wherein:

FIG. 4 is a side elevation view of a loop setting gear used in the embodiment of FIG. 2;

FIG. 5 is a side elevation view of the loop setting gear shown in FIG. 4, but taken from the side opposite the side shown in FIG. 4;

FIG. 6 is a side elevation view of the complete lower loop restorer mechanism with the control arm assembly in the park position with the movie projector in the forward projection mode;

FIG. 7 is a side elevation view of the lower loop restorer shown in FIG. 6, but with the control arm assembly pivoted downward from the park position to a lower, extended position;

FIG. 8 is a side elevation view of the lower loop restorer shown in FIG. 6 and FIG. 7 but with the movie projector in the reverse projection mode and the lower loop restorer triggered; and FIG. 9 is a side elevation view of the lower loop restorer shown in FIG. 6, FIG. 7, and FIG. 8 but with a lock out lever engaged.

SUMMARY OF THE INVENTION

A lower loop restorer for automatically resetting the lower loop of a motion picture projector when the lower loop is lost includes a pivotably mounted control arm having a film engaging element at its distal end. The control arm is pivotably from an initial part position to an extended position to cause the film engaging element to reset the lower loop. A crank pin, extending from a rotatably mounted loop set gear, is selectively engageable with the control arm to cause the control arm to pivot. Trigger means are provided to cause drive means to engage the loop set gear when the lower loop is lost.

DESCRIPTION OF THE PREFERRED EMBODIMENT

Figure 1:
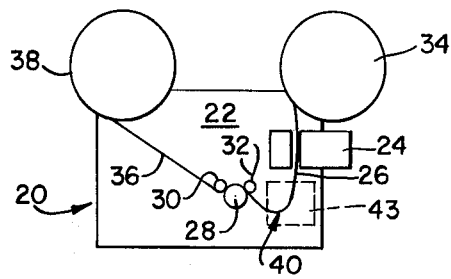
FIG. 1 is a simplified schematic side elevation illustration of a motion picture projector suitable for use with the present invention.

A movie film projector 20 suitable for use with the present invention is illustrated in schematic fashion in FIG. 1. The projector 20 includes a side wall 22 with a conventional projection lens 24, a film gate 26, and a sound drum 28 with cooperating rollers 30 and 32 supported on the side wall 22. A film supply reel 34 supplies film 36 along a path leading from the supply reel 34 thru the film gate 26, to and around the sound drum 28, and to a take-up reel 38. A lower loop, generally designated by the reference character 40, is formed in the film 36 between the film gate 26 and the sound drum 28 to isolate the motion imparted to the film 36 as it is incremented thru the film gate 26 from the sound drum 28. A lower loop restorer 42, not shown in FIG. 1, is located on the projector side wall 22 in the area enclosed by the broken line 43. Rollers, sprockets, and other projector elements not essential to an understanding of the present invention have been omitted from FIG. 1.

Figure 2:
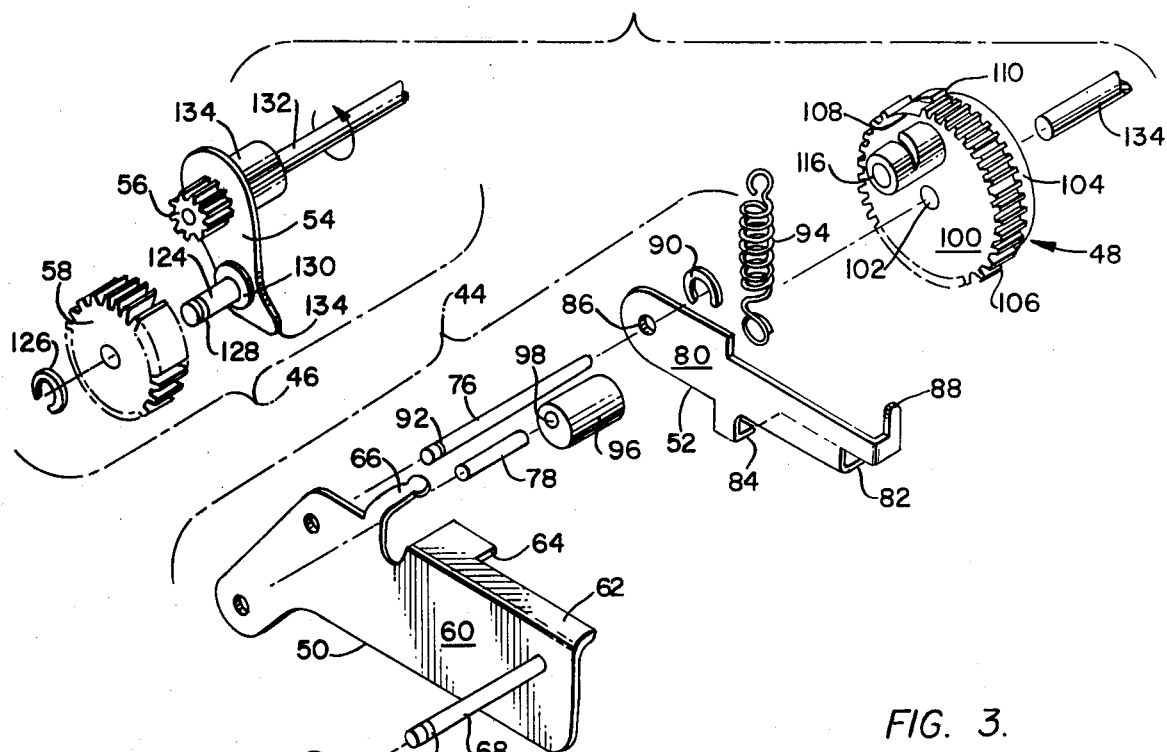
FIG. 2 is an exploded perspective view of the principle elements of the preferred lower loop restorer of the present invention.

The principle elements of applicant's lower loop restorer 42 mechanism are illustrated in exploded perspective in FIG. 2. As shown therein, the lower loop restorer 42 includes a control arm assembly 44, a swing arm assembly 46, and a loop set gear 48. The control arm assembly 44 is assembled from an outer control arm 50 and an inner control arm 52, and the swing arm assembly 46 is assembled from a swing arm plate 54, a pinion gear 56, and an idler gear 58.

The outer control arm 50, which is preferably fabricated from a sheet metal stamping, includes a vertical plate portion 60 with a lateral surface 62 extending outward from the upper edge of the plate 60. The lateral surface 62 includes a triggering edge 64, the function of which is described in detail below. A tab 66, which extends laterally outward from the upper edge of the outer control arm 50 in the same direction as the lateral surface 62, is also provided. A shaft 68 having one end secured to the plate portion 60 of the outer control arm 50 extends laterally outward from the outer control arm 50 in the direction opposite that of the lateral surface 62 and the tab 66. A conventional diploconical film engaging roller 70 is rotatably mounted on the shaft 68 and restrained from axial translation thereon by a "C" ring 72 located in a groove 74 formed at the distal end of the shaft 68. Two shafts 76 and 78 extend laterally outward from the side of the outer control arm 50 in the same direction as the tab 66 and the lateral surface 62. The function of the shaft 76 and the shaft 78 are described below.

The inner control arm 52, which is preferably fabricated from a sheet metal stamping, includes a vertical plate portion 80 with a lateral surface 82 extending outward from the lower edge of the plate portion 80. A tab 84 also extends outward from the lower edge of the inner control arm 52 in the same direction as the lateral surface 82. The left side of the inner control arm 52 has a mounting bore 86 formed therein and the right side of the inner control arm 52 is turned to define a stop surface 88 as illustrated in FIG. 2.

Figure 3:
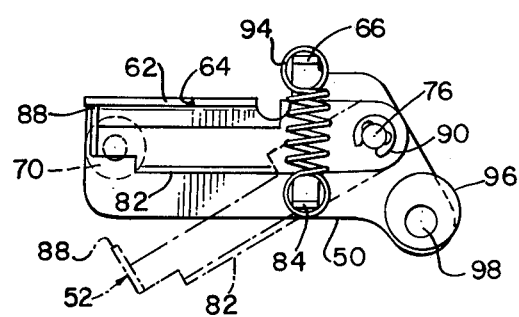
FIG. 3 is a side elevation view of some of the elements of FIG. 2 when assembled.

FIG. 3 illustrates the outer control arm 50 assembled to the inner control arm 52 from the side opposite that illustrated in FIG. 2. The outer control arm 50 is assembled to the inner control arm 52 by mounting the inner control arm on the shaft 76 and restraining it from axial translation thereon by a "C" ring 90 disposed in a groove 92 formed in the shaft 76. When the outer control arm 50 and the inner control arm 52 are assembled, the tab 66 and the tab 84 are in vertical registration with one another. One end of a coil spring 94 in tension is anchored to the tab 66 and the other end of the spring 94 is anchored to the tab 84 to cause the stop 88 at the distal end of the inner control arm 52 to be resiliently biased against the under side of the lateral surface 62 of the outer control arm 50. The inner control arm 52 may be pivoted relative the outer control arm 50 to the position shown by the broken line illustration of FIG. 3.

A cylindrical lock-out pin 96, shown in FIG. 2 and FIG. 3, having an eccentric axially aligned bore 98 there thru, is rotatably mounted on the shaft 78 and restrained from axial translation thereon by any suitable means. The function of the lock-out pin 96 is described below.

The loop set gear 48, shown in perspective in FIG. 2 and in side elevation views in FIGS. 4 and 5, includes a body portion 100 having a central mounting bore 102 there thru. The peripheral surface of the loop set gear 48 is divided into a cylindrical surface portion 104 and a portion having a plurality of uniformly spaced gear teeth 106 formed thereon. A space or gap 108 is provided in the gear teeth 106 as shown in FIGS. 2, 4, and 5. A cam 110, (FIGS. 4 and 5) having a ramp 112 and a ramp 114, is formed on the cylindrical surface 104. The cam 110 is so located that it is in registration with the gap 108, and axially offset or spaced from the gear teeth 106.

As shown in FIGS. 2 and 4, a crank pin 116 extends laterally outward from the side of the loop set gear 48. The peripheral surface of the crank pin, when viewed from the end as in FIG. 4, has a spiral form with a trigger surface 118 or step formed therein. The opposite side of the loop set gear 48, shown in FIG. 5, includes a hub 120 surrounding the mounting bore 102. The hub 120 has a portion cut away to define a flat surface 122.

The swing arm assembly 46, shown in perspective view in FIG. 2, carries both the input pinion gear 56 and the idler gear 58. A swing arm plate 54, preferably fabricated from a metal stamping, includes a shaft 124 secured to and extending laterally outward from the plate 54. The idler gear 58 is rotatably mounted on the shaft 124 and restrained from axial translation thereon by a "C" ring 126 disposed in a groove 128 formed at the distal end of the shaft 124. A bowed spring washer 130 is mounted on the shaft 124 between the idler gear 58 and the swing arm plate 54. The spring washer 130 applies a preload force, in the axial direction, to the idler gear 58 to provide a rotary friction drag between the idler gear 58 and the shaft 124. The pinion gear 56 is secured to one end of an input shaft 132 for rotation therewith. The shaft 132 is rotatably mounted in a bearing 134 in the swing arm plate 54 for rotation relative thereto and also rotatably mounted in a support bearing (not shown) in the projector side wall 22. The end of the input shaft 132 remote from the pinion gear 56 is connected to suitable drive means, such as a pulley and elastomer drive means, (not shown), which provides input rotation to the pinion gear 56. When the idler gear 58 and the pinion gear 56 are assembled to the swing arm plate 54, the idler gear 58 and the pinion gear 56 are in constant mesh. Rotation of the pinion gear 56 will cause rotation of the idler gear 58. The swing arm plate 54 is so formed to include a cam follower surface 134 which extends outward beyond the addendum circle of the idler gear 58. The function of the follower surface 134 is described below.

FIG. 6 represents the assembled lower loop restorer 42 when the movie projector is in the forward projection mode. The position of the various elements shown in FIG. 6 is defined herein as the park position. As shown therein, the swing arm assembly 46 is rotatably supported in the projector side wall 22 by the input shaft 132 which extends thru a bearing (not shown) in the projector side wall 22, the loop set gear 48 is rotatably mounted on a shaft 134 which is secured to and extends laterally outward from the projector side wall 22, and the control arm assembly 44 is rotatably supported in the projector sidewall 22 by the shaft 76 which is secured to the outer control arm 50 and extends thru a bearing (not shown) in the projector sidewall 22. A lock-out lever 136, whose function is described below, is shown below the lower loop restorer 42.

In the forward projection mode, the projector drive means rotates the input pinion 56 in the counter-clockwise direction as indicated by the arrow 138. The rotary drag on the idler gear 58 provided by the spring washer 130 (FIG. 2) causes the swing arm assembly 46 to rotate in the counter-clockwise direction as indicated by the arrow 142 to cause the cam follower 134 to contact the ramp 112 of the cam 110 located on the loop set gear 48. Since the cam folower 134 extends beyond the addendum circle of the idler gear 58, the idler gear 58 is prevented from engaging with and causing rotation of the loop set gear 48.

The conrol arm assembly 43 is so located relative the loop set gear 48 that the triggering edge 64 (FIGS. 2 and 3) formed on the lateral surface 62 is engageable with the triggering surface 118, the loop set gear 48 is prevented from rotating in the counter-clockwise direction as indicated by the arrow 144.

A flat spring 146, acting on the hub 120 of the loop set gear 48, is provided to resiliently bias the loop set gear 48 for an incremental rotation in the counter-clockwise direction as indicated by the arrow 144. The spring 146, which is preferably fabricated from a section of flat spring steel, has both ends turned around pins 148 which are secured to and extend laterally outward from the projector sidewall 22. Rotation of the loop set gear 48 in the clockwise direction as indicated by the arrow 150 will cause the edge 152 of the flat 122 on the hub 120 to deflect the center region of the spring 146 in the direction of the arrow 154 and store potential energy in the spring 146 sufficient to bias the loop set gear 48 for rotation in the counter-clockwise direction of the arrow 144, and thereby bias the triggering surface 118 (FIG. 4) against the triggering edge 64 (FIG. 2).

Thus, when the lower loop restorer 42, is in the park position and the projector 20 is in the forward projection mode as shown in FIG. 6, the pinion gear 56 is rotating in the counter-clockwise direction as indicated by the arrow 138 and thereby biasing the swing arm assembly 46 in the direction of the arrow 142. The rotating idler gear 58 is poised near the gap 108 for engagement with the gear teeth 106 of the loop set gear 48. The cam follower 134, in contact with the ramp 112 of the cam 110 positions the swing arm assembly 46 away from the loop set gear 48 and thereby prevents engagement between the idler gear 58 and the loop set gear 48. The loop set gear 48 is rotatably biased by the spring 146 for incremental rotation in the direction indicated by the arrow 144 but is prevented from such incremental rotation by the engagement of the triggering surface 118 with the triggering edge 64. With the lower loop restorer 42 elements configured in the park position as described above, the lower loop restorer 42 is ready to trigger should the lower loop 40 be lost.

When the film 36 fails to be advanced out of the film gate 26 by the film advancing means, the sound drum 28 will continue to transport the film 36 and thereby cause the film path between the film gate 26 and the sound drum 28 to shorten. The film 36 will be drawn into the path represented by the dotted line 156 in FIG. 6. The film 36 will engage the film roller 70 at the distal end of the control arm assembly 44 and cause the control arm assembly 44 to pivot in the counter clockwise direction as indicated by the arrow 158. This rotation of the control arm assembly 44 will cause the triggering edge 64 to disengage from the triggering surface 118. The potential energy stored in the spring 146 acting against the hub edge 152 will cause the loop set gear 48 to incrementally rotate in the counter-clockwise direction of the arrow 144. As the loop set gear 48 is rotated, the gear teeth 106 will be presented to the idler gear 58 and the cam follower 134 of the swing arm assembly 46 will move along the ramp surface 112 (FIG. 4) of the cam 110 and then down the ramp 114 to cause the swing arm assembly 46 to pivot in the counter-clockwise direction of the arrow 142. The rotating idler gear 58 will move into engagement with the gear teeth 106 on the loop set gear 48 and cause the loop set gear 48 to rotate in the direction of the arrow 144. The cam 110 cooperates with the cam follower 134 to insure that engagement between the idler gear 58 and the gear teeth 106 takes place without gear lockup or jamming between the two gears. As the loop set gear 48 rotates, the crank pin 116 will bear against the lateral surface 82 of the inner control arm 52 to pivot the control arm assembly 44 clockwise to an extended position as shown in FIG. 7 and then against the lateral surface 62 of the outer control arm 50 to pivot the control arm assembly 44 counter-clockwise to return the control arm assembly 44 to park position of FIG. 6. As the control arm assembly 44 is pivoted downward, the film roller 70 will pull film 36 down from the film gate 26 to restore the lower loop 40. As the crank pin 116 moves the control arm assembly 44 upward the triggering surface 118 will contact the triggering edge 64 to stop both the control arm assembly 44 movement and the loop set gear 48 rotation. The cam follower 134 will move up the ramp 112 of the cam 110 to cause the idler gear 58 to disengage from the loop set gear 48, and the edge 152 of the flat 122 on the hub 120 will deflect the center region of the spring 146 in the direction of the arrow 154 and thereby bias the loop set gear 48 for rotation in a counterclockwise direction. The lower loop 40 is restored and the lower loop restorer 42 elements are reset to their initial park position.

During the reverse projection mode the projector motor is operated in reverse and the film 36 is drawn up to the film gate 26 in a direction opposite that from the forward projection mode. During the reverse projection mode the maintainence of a lower loop 40 is not required. A feature of the present lower loop restorer 42 is that it is disabled or inhibited from operation during the reverse projection mode. As shown in FIG. 8, the reverse projection mode causes the input pinion gear 56 to rotate in the direction of the arrow 162. The rotary drag placed on the idler gear 58 by the spring washer 130 causes the swing arm assembly 46 to rotate in the clockwise direction as indicated by the arrow 162. The swing arm assembly 46 is then rotatably biased against a stop pin 164 which is secured to and extends laterally outward from the projector sidewall 22. During reverse operation of the projector, the film path between the film gate 26 and the sound drum 28 is somewhat shortened. The film 36 is drawn up into the path represented by the dotted line 156 in FIG. 8. The film 36 will engage the film roller 70 at the distal end of the control arm assembly 44 and cause the control arm assembly 44 to rotate in the direction of the arrow 158. This rotation of the control arm assembly 44 will cause the triggering edge 64 to disengage from the triggering surface 118. The potential energy stored in the spring 146 will cause the loop set gear 48 to incrementally rotate in the direction of the arrow 144. Since the swing arm assembly 46 is rotatably biased in the direction of the arrow 162 against the stop pin 164 by the reverse input rotation of the input gear 56, the idler gear 58 cannot engage the loop set gear 48 to cause loop set gear 48 rotation and consequent movement of the control arm assembly 46. Thus during reverse projection operation, the lower loop restorer 42 is disabled or inhibited from operation. If the projection mode is changed from the reverse direction mode to the forward projection mode, the swing arm assembly 46 will be rotatably biased in the direction of arrow 142 and the idler gear 58 will engage the gear teeth 106 of the loop set gear 48 to cause the loop set gear 48 to restore the lower loop 40 as described above.

When the movie projector 20 is operated in either the in path fast forward mode or the in path rewind mode it is necessary that the film roller 70 be in a fixed location for in path film transport. The lock out lever 136 is provided to prevent the operation of the lower loop restorer 42 mechanism during these modes. As shown in FIG. 8, the lock-out lever 136 is secured on its left side to one end of a shaft 166 which is rotatably mounted in a bearing (not shown) carried by the projector sidewall 22. The lock-out lever 136, which is connected by connecting means to the projector mode selection switch (not shown), is pivotable from a first position shown in FIGS. 6, 7, and 8 to a second position shown in FIG. 9. The right side of the lock-out lever 136 has a slot 168 formed therein adapted to receive the lock-out pin 96 when the lock-out lever 136 is in the second position as shown in FIG. 9. During the in path fast forward mode the lock-out lever 136 is caused to engage the lock-out pin 96 and prevent rotation of the outer control arm 50. Should the lower loop restorer 42 be triggered, the idler gear 58 will engage the loop set gear 48 and cause rotation of the loop set gear 48 in the direction of the arrow 144. Since the outer control arm 50 is locked against movement by the lock-out lever 136, the crank pin 116 will pivot the inner control arm 52 only by engaging the lateral surface 82 of the inner control arm 52 and drive the inner control arm 52 in the direction of the arrow 170 against the resilient biasing force of the coil spring 94 as illustrated in FIG. 9. Thus during the in path fast forward mode, the outer control arm 50 and the film engaging roller 70 connected thereto are inhibited from resetting the loop 40 by the lock out lever 136 engaging the lock out pin 96. During the in path rewind mode the lock-out lever 136 is also caused to engage the lock-out pin 96 and prevent rotation of the outer control arm 50.

The use of the outer control arm 50 pivoted to the inner control arm 52 prevents damage to the film 36 should an attempt be made to reset the lower loop 40 and the film 36 be so jammed, obstructed, or otherwise immobilized in the film gate 26 that it cannot be pulled down by the outer control arm 52 without damaging the film 36. Thus, should the film 36 be jammed in the film gate 26 and the lower loop restorer 42 triggers, the control arm assembly 44 will attempt to pivot and pull film from the film gate 26 to reset the lower loop 40. If the force required to pull the film 36 from the film gate 26 is greater than the force provided by the coil spring 94 which biases the inner control arm 52 to the outer control arm 50, the inner control arm 52 will pivot relative the outer control arm 50 as illustrated in FIG. 9 and thereby limit the force applied to the film 36. In this way film 36 which is tightly jammed in the film gate 26 is protected from damage during an attempted restoring of the lower loop.

As is apparent to those skilled in the art, various changes and modifications may be made to the mechanism described herein without departing from the spirit and the scope of the present invention as defined by the appended claims and their legal equivalent.

We claim:

1. A loop restoring mechanism for use in combination with a movie film projector having a film gate thru which film is incrementally driven, a sound drum around which the film is continuously driven, and a pre-defined film loop path therebetween comprising:

a pivotally mounted control arm having a film engaging element connected thereto;

said control arm having an initial park position which locates said film engaging element on the interior side of said film loop path;

said conrol arm pivotable from said park position to an extended position to cause said film engaging element to pull film from said film gate;

a rotatably mounted loop set gear having a crank pin extending therefrom;

said crank pin engageable with a surface portion of said control arm to cause said control arm to pivot from said park position to said extended position and back to said park position thereby causing said film engaging element to pull said film from said film gate;

drive means selectably engageable and disengageable with said loop set gear to cause said loop set gear to rotate and thereby cause said control arm to pivot from said park position to said extended position and back to said park position;

trigger means associated with said control arm and said loop set gear to cause said drive means to engage said loop set gear and pivot said control arm when said film loop is lost.

2. The loop restoring mechanism claimed in claim 1 wherein said control arm further comprises:

a pivotally mounted first arm having said film engaging element connected thereto;

a second arm pivotably mounted to said first arm;

resilient biasing means to resiliently bias said first arm to said second arm.

3. The loop restoring mechanism claimed in claim 2 wherein:

said crank pin is engageable with a surface portion of said second arm to cause said control arms to pivot from said park position to said extended position and engageable with a surface portion of said first arm to cause said control arm to pivot from said extended position to said park position.

4. The loop restoring meehanism claimed in claim 1 wherein said drive means further comprises:

a rotating gear selectively engageable with said loop set gear.

5. The loop restoring mechanism claimed in claim 2 wherein said trigger means further comprises:

a triggering edge formed on said crank pin;

a triggering surface formed on said first arm;

said triggering edge and said triggering surface engageable with one another to hold said control arm in said park position;

whereby loss of said lower loop causes said triggering edge to disengage from said triggering surface to cause said drive means to engage said loop set gear.

6. The loop restoring mechanism claimed in claim 1 wherein:

said film engaging element serves to provide in-path film transport.

* * * * *